United States Patent [19]
Whysall

[11] Patent Number: 6,139,178
[45] Date of Patent: Oct. 31, 2000

[54] MOVABLY MOUNTED FEED-ROLL HEAD FOR EXTRUDERS

[75] Inventor: Simon A. Whysall, Rockford, Mich.

[73] Assignee: APV Baker division of APV Baker North America, Inc., Goldsboro, N.C.

[21] Appl. No.: 08/952,904

[22] PCT Filed: Mar. 11, 1997

[86] PCT No.: PCT/US97/03566

§ 371 Date: Nov. 21, 1997

§ 102(e) Date: Nov. 21, 1997

[87] PCT Pub. No.: WO97/33480

PCT Pub. Date: Sep. 18, 1997

Related U.S. Application Data

[60] Provisional application No. 60/013,409, Mar. 14, 1996.

[51] Int. Cl.[7] .................................................. A21C 3/04
[52] U.S. Cl. ..................... 366/76.5; 425/188; 425/190; 425/193; 425/376.1
[58] Field of Search .................... 366/69, 73, 76.5, 366/76.6, 76.93; 425/182, 188, 190, 193, 194, 376.1

[56] References Cited

U.S. PATENT DOCUMENTS

| | | |
|---|---|---|
| 3,448,696 | 6/1969 | Verhoeven . |
| 3,469,540 | 9/1969 | Werner . |
| 3,547,050 | 12/1970 | Verhoeven . |
| 3,669,587 | 6/1972 | Werner . |
| 4,127,373 | 11/1978 | Anders et al. . |
| 4,212,609 | 7/1980 | Fay . |
| 4,395,427 | 7/1983 | Fischer et al. . |
| 4,586,888 | 5/1986 | Anderson . |
| 4,718,770 | 1/1988 | Christy . |
| 5,322,570 | 6/1994 | Anderson . |
| 5,851,065 | 12/1998 | Ikeda et al. ............................ 366/76.5 |

*Primary Examiner*—Charles E. Cooley
*Attorney, Agent, or Firm*—Price, Heneveld, Cooper, DeWitt & Litton

[57] ABSTRACT

A movably mounted and adjustably positionable feed-roll head for a food extruder or the like (110, 210) having a unitized head assembly which includes at least one feed-roll (114, 116, 214, 216) and its related operational structure and rigid but movably mounted supports (124, 224, 225) for each end of the feed-rolls and related structure, whereby the entire unitized assembly may be moved relative to the remainder of the extruder for cleaning, die change, etc., without disassembly or removal of the feed-rolls, etc. The preferred mounting for the unitized structure is a pivot mechanism (126, 226, 227) for each of the feed-roll supports, and a readily adjustable repositioning mechanism (128, 228) such a screw jack assembly (232) is coupled to the other side of the feed-roll supports, whereby gradual and progressive position changes of the unitized feed roll assembly are made possible. The unitized feed-roll assemblies may include a pair of cooperatively mounted feed-rolls (114, 116), and two or more such unitized assemblies (224, 225) may be used together in a single extruder, with each such assembly being adjustably repostionable, either separately or cooperatively.

33 Claims, 7 Drawing Sheets

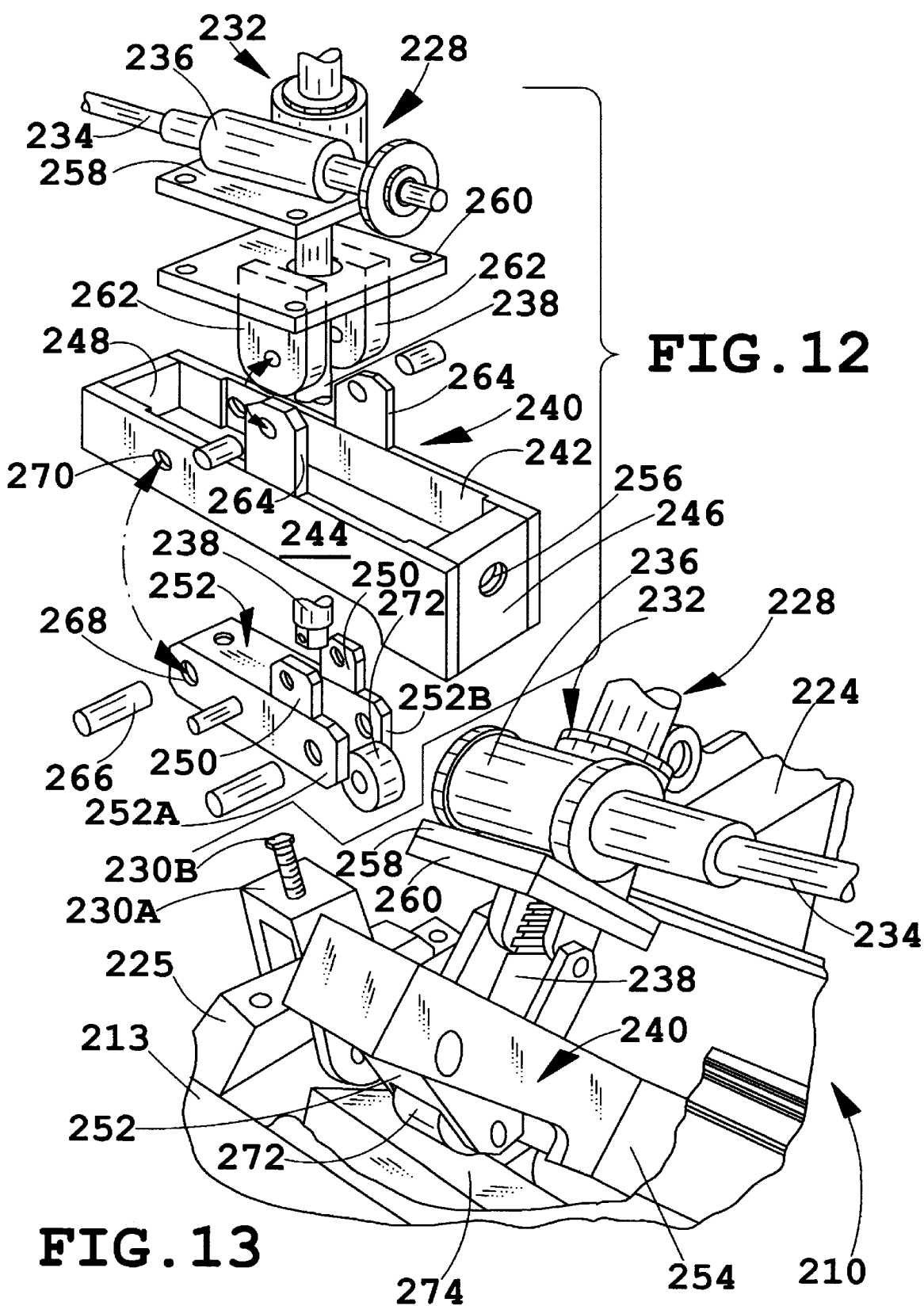

MOVABLY MOUNTED FEED-ROLL HEAD FOR EXTRUDERS

This application is the National Stage of International Application No. PCT/US97/03566, filed Mar. 11, 1997 which claims the benefit of U.S. Provisional Application No. 60/013,409, filed Mar. 14, 1996.

BACKGROUND

This invention relates generally to extruders, particularly those used in the food-processing industry, and more particularly relates to the continuously operable feed-roll-actuated extruders used in the food-processing industry to produce wafer-type products such as cookies, etc.

As is well known in the food-processing field, extruders of the particular type just noted utilize one or more rotatable feed-rolls mounted in media supply hoppers to force a continuous relatively thin stream of food product or other such media out of the hopper and onto or into some further processing apparatus. Usually, such feed-rolls comprise elongated metal cylinders having axially extending ridges about their outer periphery, whose cross-section may vary considerably but often is sawtooth-shaped. In a typical example, a pair of closely positioned counter-rotating such rollers are mounted within, or partially within, the supply hopper near its bottom, and a particular spacing is provided between them which will cause a continuous supply of media to be forced out below them at a particular pressure, depending upon their rotational spaced and surface configuration.

This pressurized stream of media is then directed generally downward into an elongated filler block whose cross-sectional shape complements the generally triangular open area immediately between and below the feed-rolls so as to interfit closely therewith and which is provided with a series of adjacent, downwardly opening through-passages, through which the pressurized media is fed. An elongated die having a series of adjacent through-passages ("cups") is disposed directly beneath the filler block, with the passages of each in registration so that the media moves downwardly through the filler block and then through the die openings in generally continuous cylindrical streams whose cross-sectional shape is determined by the geometry of the die openings and often has some particular peripheral configuration. As the streams of media move downwardly through the die openings, they are typically severed transversely with repeated knife strokes across the bottom of the die to provide a continuing succession of wafers which drop downwardly onto a moving conveyor belt or the like immediately thereabove.

Prior patents assigned to the Assignee of the present invention which disclose subject matter that generally illustrates apparatus of the type noted above include U.S. Pat. Nos. 5,322,570, 4,586,888, 4,395,427, 3,669,587, 3,547,050, 3,469,540 and 3,448,696.

Feed-rolls of the above type are necessarily large and relatively massive members, and since the relative spacing between such rollers and the filler blocks or dies, as well as between one another when used in pairs or other combinations, is very close and rather critical, it has heretofore been customary to rigidly mount such feed-rolls in a basically permanent and fixed manner. Generally this was done by providing accurately machined semi-circular half-journals in the rigid support frame of the machine and a yoke-like cap member that mated with the frame and also had semi-circular half-journals to fit closely around the outwardly extended machined ends of the feed-rolls. These were rigidly bolted together to provide a unified support structure which was rigidly fixed in place. Since cleanliness and sanitation are very important aspects of food-manufacturing machinery, however, it is necessary to disassemble such feed-roll units on the production floor for periodic cleaning of them and their related filler blocks, dies, etc. This has always required a sizeable and disruptive undertaking of personnel and related lifting machinery, etc., with a corresponding loss of production time. Of course, the requisite reassembly also involved an inevitable risk of error in assembly, adjustment, etc., as well as a corresponding need for trial runs, etc. This same sequence of events and conditions also accompanied desired changes in the filler block and/or die used for manufacturing a particular product, since removal of the superimposed feed-roll, and related structure has been a prerequisite to that as well.

BRIEF DESCRIPTION OF INVENTION

The present invention provides a new and effective solution for the foregoing problems in the form of new methods and apparatus for mounting and supporting the feed-rolls and associated hoppers together as unitized, modular structures which are readily moveable as an integral unit, without disassembly, in a rapid and easy manner and without changing the relative position of one such paired feed-roll with that of the other in the pair. In so doing, the invention provides a unique new mounting structure for the feed-rolls, together with a unique new positioning structure, concept and arrangement for such mounting structure and the feed-rolls carried thereby, whereby the invention may be advantageously utilized in a number of particular different applications both within and without the food-processing industry, and in various machinery configurations so used.

In one preferred embodiment, the invention provides a position-variable feed-roll head for food extruders and the like, comprising at least one pair of feed-rolls disposed in generally parallel relation and close proximity to one another which are rotatably mounted in a secure and not mutually shiftable manner within rigid support members (headframes) located at each end, to thereby form an integral unitary assembly. This assembly is pivotally or otherwise movably mounted upon the extruder in a position determined by an adjustment mechanism, such that the particular position of the unitary feed-roll head assembly may be varied by manipulation of the adjustment mechanism, and may be moved sufficiently relative to other portions of the extruder media flow path whereby extruder apparatus such as a filler block or other such distribution/manifolding apparatus, and/or the extruder dies, etc., may be readily removed for cleaning, replacement, etc.

In one embodiment of the invention, such a unitary feed-roll head may include as single pair of cooperatively disposed feed-rolls, whereas in other embodiments more than one such feed-roll unit is utilized, each being mounted for movement relative to one another and also relative to the filler block, die cups, or other such adjacent portions of the extruder mechanism. In one such embodiment, two such feed-roll units are mounted for pivotal motion toward and away from one another and are generally disposed in a mutually inclined relationship, whereby their opening and closing movements are clam shell-like in nature. Particularly in such an embodiment as this, the invention also provides for a novel and useful actuation mechanism which mounts on one such feed-roll unit and exerts direct force against the other such unit, thereby exerting indirect force against the unit on which it is mounted, to thereby bring about motion of both such units either toward or away from one another.

The objects and advantages of the invention, together with a more complete understanding of illustrative embodiments thereof will become increasingly apparent upon consideration of the ensuing specification and the attached drawings.

BRIEF DESCRIPTION OF THE DRAWINGS

FIG. 12 is an enlarged fragmentary exploded perspective view showing details of the adjustment mechanism used in the embodiment of FIG. 2; and FIG. 13 is a further enlarged, fragmentary perspective view showing the adjustment mechanism of FIG. 12 in an assembled, mounted, and operational state, illustrating a first position of adjustment.

DESCRIPTION OF PREFERRED EMBODIMENTS

Figure 1:
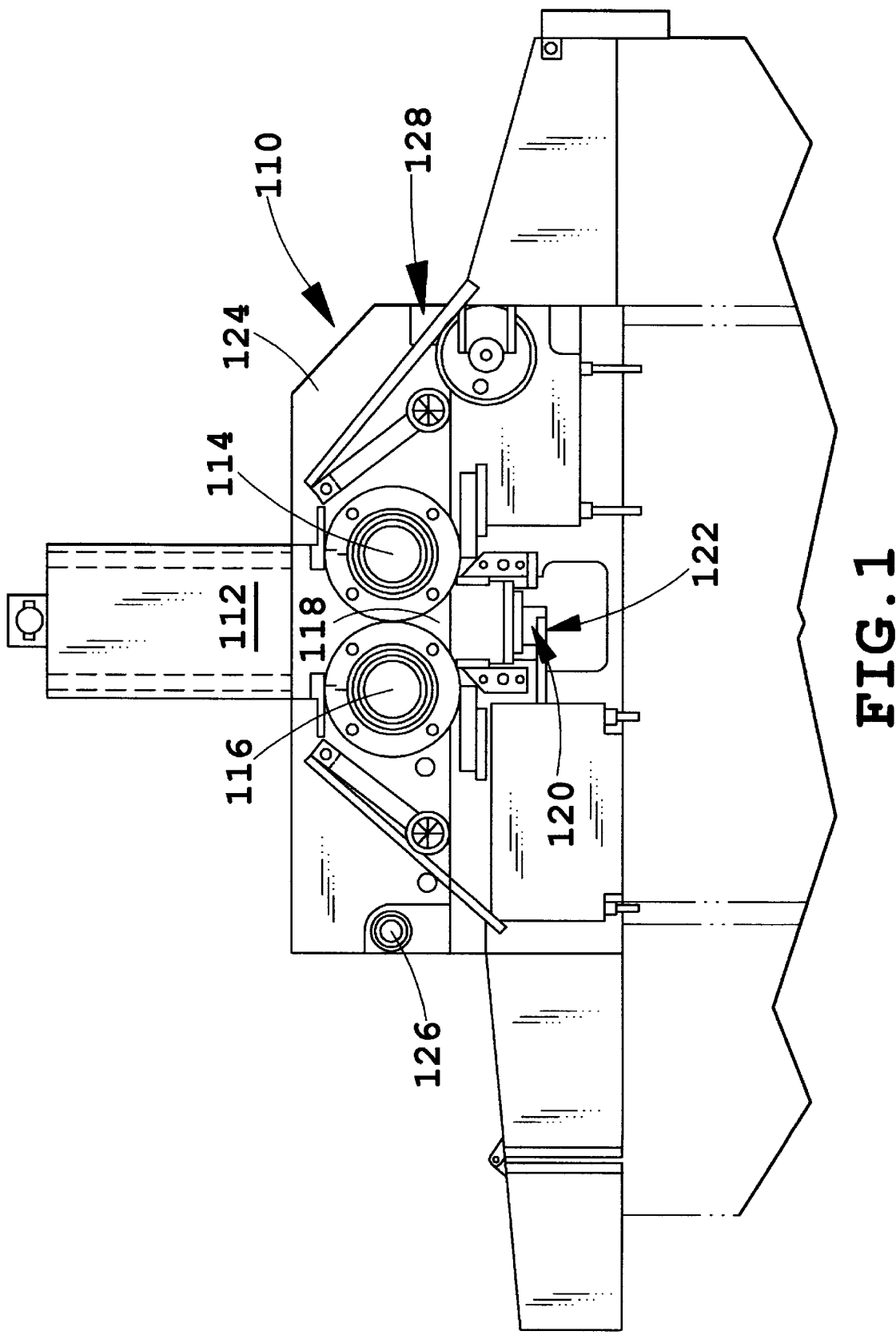
FIG. 1 is an illustrative side elevational view depicting an illustrative food extruder incorporating a first embodiment of the invention having a single movably mounted feed-roll unit.
Figure 2:
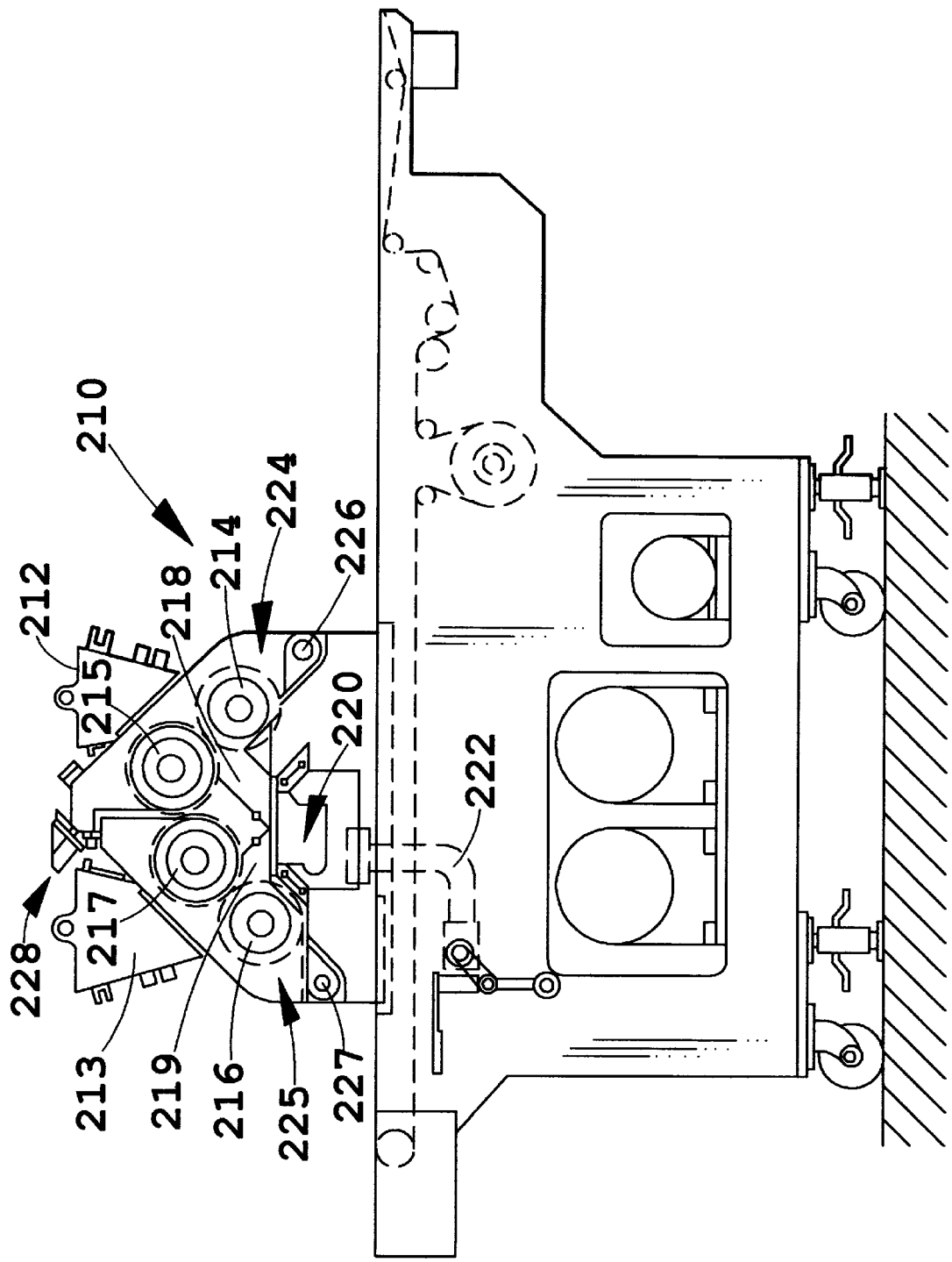
FIG. 2 is an illustrative side elevational view depicting an illustrative food extruder incorporating a second embodiment of the invention having a two movably mounted feed-roll units.

The basic, overall nature of two exemplary installations utilizing the apparatus is illustrated in FIGS. 1 and 2, of which FIG. 1 shows an installation with two feed-rolls and a single hopper, and FIG. 2 shows a four-roll, two-hopper installation. Since these two machines have considerable operational and structural similarity, they are referred to by use of a common or related numbering sequence, in which FIG. 1 utilizes the number "1" as a prefix and FIG. 2 utilizes the number "2" as a prefix. Thus, the feed-roll extruder machines 110, 210 will be seen to comprise a station along an elevated conveyor line, in which the media to be processed (for example, baking dough) is supplied to a hopper 112 (FIG. 1) or 212, 213 (FIG. 2) and forced by counter-rotating feed-rolls 114, 116 (FIG. 1) or 214, 215, 216, 217 (FIG. 2) in a generally downward direction through a filler block 118 (FIG. 1) or 218, 219 (FIG. 2) and an aligned die 120, 220 to be repetitively severed by an oscillating knife 122, 222, preferably of the type known as a "wirecut", whose cutting member comprises an elongated, thin knife member analogous to a taut wire. As will be understood, the resulting succession of wafer-like pieces drop downwardly onto a horizontally-moving conveyor which runs beneath the cut-off knife just mentioned, for further processing downstream.

In a very general sense, the machines 110, 210 shown in FIGS. 1 and 2 are much like those previously known and used in the trade; however, in accordance with the present invention the feed-rolls in these machines are mounted in a substantially different manner than that known previously. Referring first to FIG. 1, the dual feed-rolls 114, 116 are both mounted in a unitary support block or headframe 124 disposed at each of the two opposite sides of the installation (i.e., at each opposite end of the feed-rolls), and the support members 124 are mounted for pivotal movement, with the installed feed-rolls in place, as a unit, by a pivot pin 126 at one side of each of these supports. At the other side, opposite pivot pin 126, an adjustment mechanism 128 such as a screw jack is provided. As a result, it will be appreciated that the entire feed-roll head including the hopper 112, both feed-rolls 114, 116 and the headframe supports 124, may be pivoted as a unit about the axis established by the mutually aligned pivot pins 126 of the two such supports, as a function of the particular amount of elevation imparted by the screw jack 128. Of course, various other types of movable mounting apparatus may be used with or in place of the pivot pins 126, and various other types of adjustment means may be used to impart this movement, but a screw jack provides a convenient and readily operated such means and also provides a way by which the feed-rolls may in effect be locked in a desired position of adjustment. That is, the lower end 128a of the jack screw (FIG. 9) is preferably captured in a jack post 144 fixed to the base or frame of the overall machine, ensuring that the feed-rolls and head unit cannot be inadvertently raised away from the filler block 118, etc.

As will be understood upon examination, the machine 210 of FIG. 2 embodies a structure similar to that just described with respect to FIG. 1. That is, the feed-rolls 214 and 215 are mounted in a first unitary headframe or end support 224 having a pivot pin mount 226, and the opposite two feed-rolls 216, 217 are mounted in a second headframe or end support 225 having its own separate pivot pin 227. In this case, however, the two unitary feed-roll assemblies so described are inclined at an angle with respect to one another and locked together at their upper extremities to ensure the desired positioning of each set of feed-rolls relative to its respective filler block 218, 219 disposed immediately therebelow. The two separate feed-roll units so resulting may be readily pivoted apart from one another to allow for cleaning, etc., in a manner generally similar to but specifically differing from that discussed above in connection with FIG. 1. Preferably, this is accomplished by a different screw jack arrangement, discussed in further detail below, in which a screw jack mechanism or unit 228 (FIGS. 2 and 6–8 inclusive) mounted on or fixed with respect to one of the end supports on each side of the machine pushes against the other such end support or other structural part of the opposed feed-roll unit to force the two apart, preferably by use of an overlapping arrangement in which the forced pivotable movement of the feed-roll unit against which the screw jack bears carries the other feed-roll unit with it, with each such unit moving about its own respective pivot point 226, 227.

Figure 3:
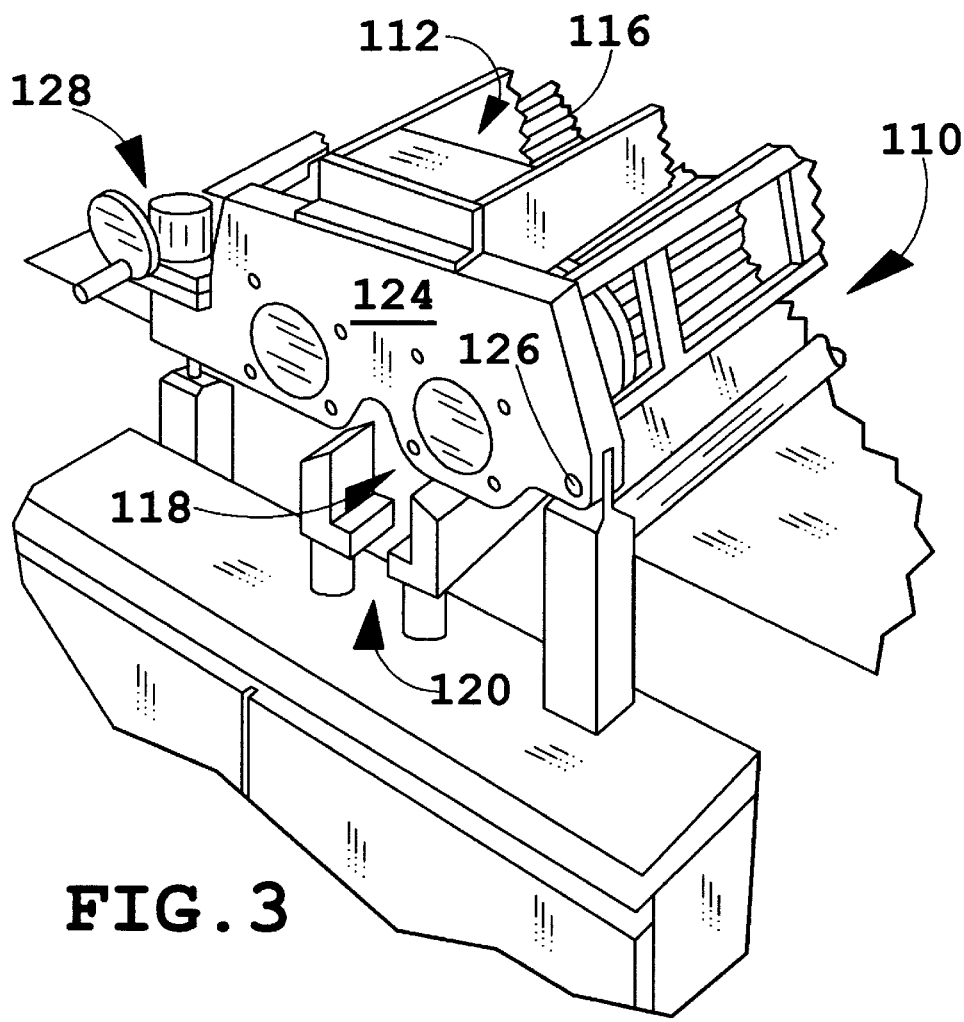
FIG. 3 is a fragmentary perspective view showing the general nature and certain structural features of a movably mounted feed-roll head having a single pair of feed-roll.
Figure 4:
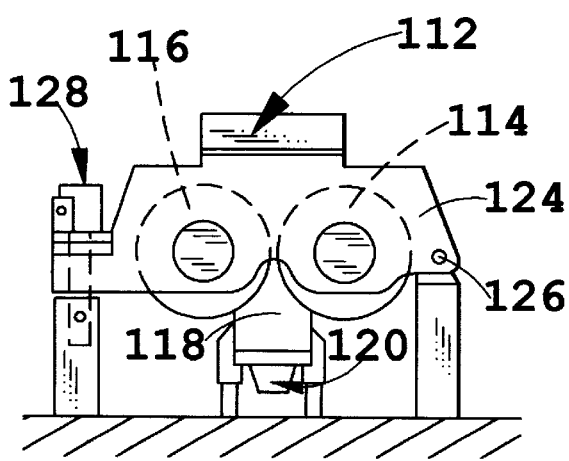
FIG. 4 is an end elevational view of the apparatus shown in FIG. 3, showing the same in an operative position.
Figure 5:
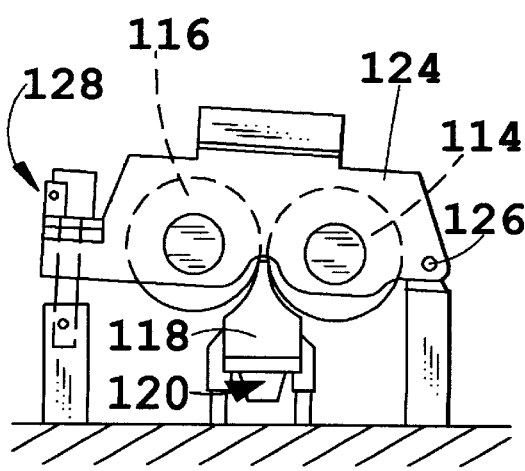
FIG. 5 is an end elevational view similar to FIG. 4 but showing the apparatus in an adjusted, non-operational position.
Figure 6:
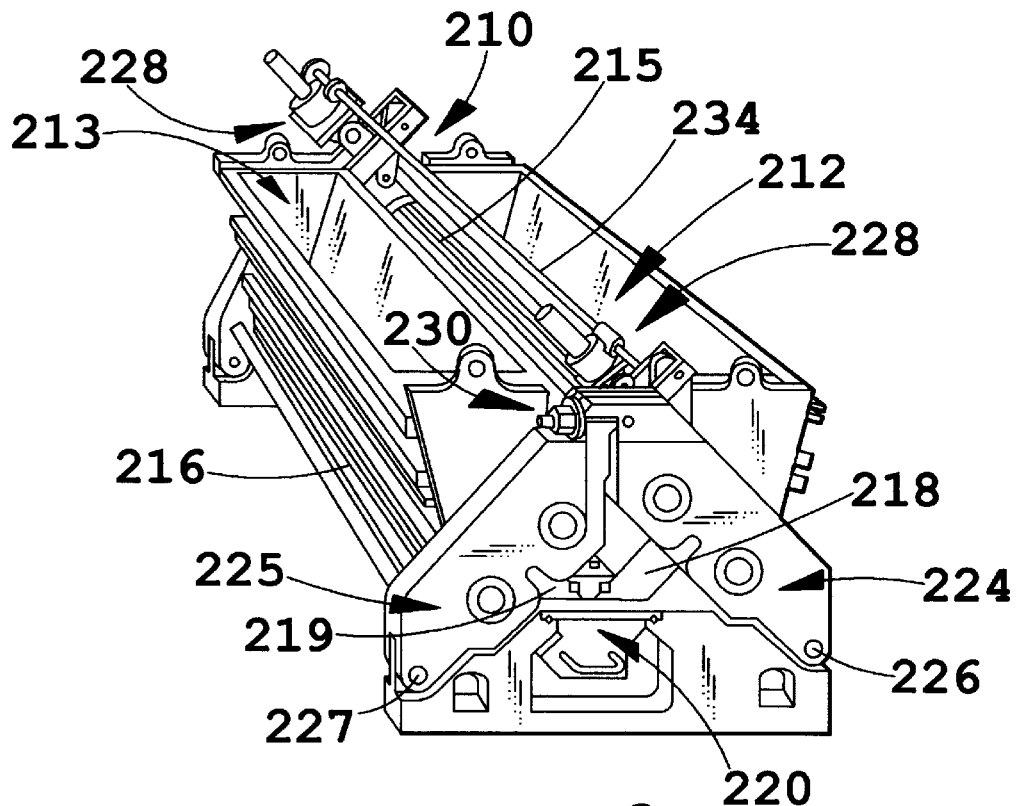
FIG. 6 is a perspective view showing the two-unit feed-roll head of FIG. 2 in an operative position.
Figure 7:
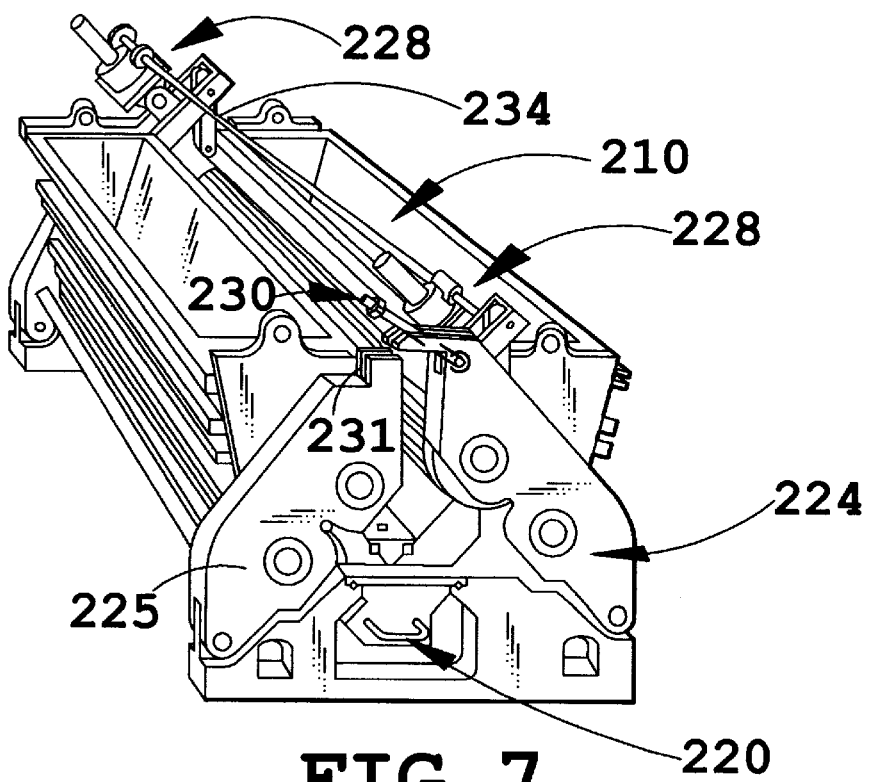
FIG. 7 is a second perspective view of the apparatus shown in FIG. 6 illustrating a first position of adjustment.
Figure 8:
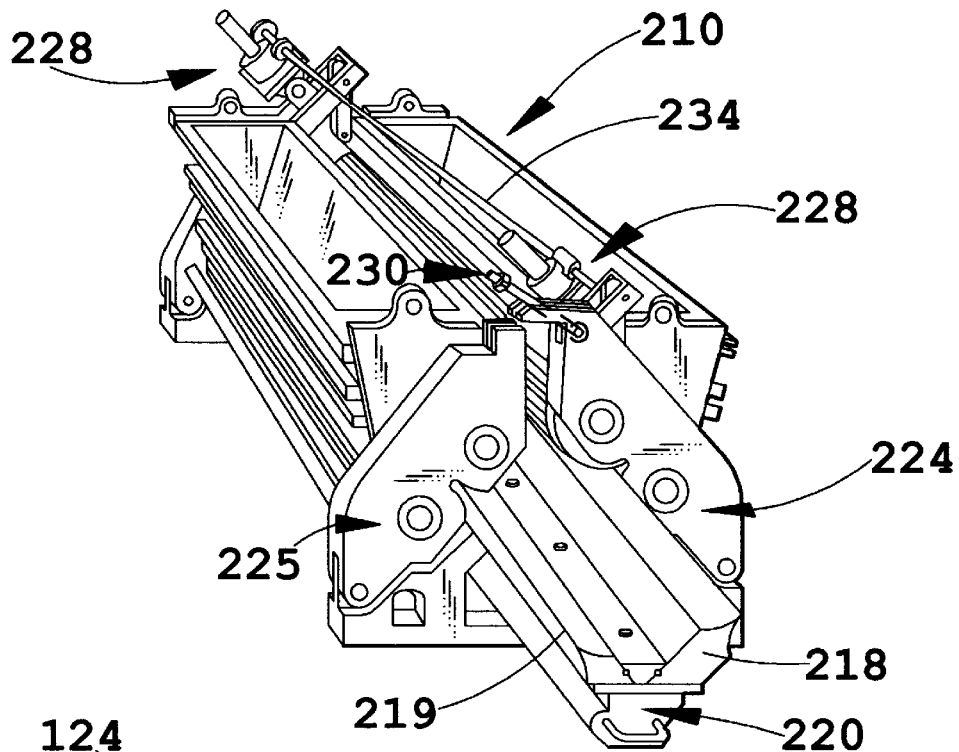
FIG. 8 is a second perspective view of the apparatus shown in FIG. 6 illustrating a second position of adjustment, in which the filler blocks and die members are shown in a partially withdrawn position.

The moveable, adjustable nature of machine 110 of FIG. 1 is illustrated in a pictorial manner by FIGS. 3, 4, and 5, and in a similar manner FIGS. 6, 7, and 8 depict the relative movability provided by the machine 210 of FIG. 2. Referring to FIGS. 3, 4 and 5 first, FIG. 4 is intended to show the basic operating position as illustrated in FIG. 1, in which the feed-rolls 114, 116 are positioned in precise indexed relation relative to the filler block 118 for proper operation, whereas in FIG. 5 the end support (headframe) 124 has been rotated in a clockwise direction about pivot point 126 by operation of the screw jack 128, to raise both of the feed-rolls together as a unit with end support 124 above the filler block at least slightly, thereby permitting retraction of the latter endwise out of the apparatus for cleaning, etc. This slightly elevated position of the feed-roll and end support unit is also illustrated in FIG. 3, which in addition shows the extended position of the filler block and die unit 118, 120.

In FIG. 6, the four-roll machine 210 is shown with its two end support-feed-roll units 224, 225 in a closed (operational) position, i.e., pivoted toward one another to the maximum extent (with upper extremities in mutual contact and overlapping), and preferably secured together in this position by a clamp-like attachment member 230. In FIG. 7, attachment member 230 has been loosened and the screw jack 228 (which may be motorized or manually operated) has been used to pivot the two end support-feed-roll units 224, 225 apart somewhat about their respective pivot points 226, 227. In FIG. 8, attachment member 230 remains loosened and this relative pivoting motion of feedroll support units 224, 225 has been carried further, i.e., feed-roll support units 224, 225 pivoted further apart to allow endwise extraction of the filler block/die unit 218, 219, 220 (which may be an integrated unit as illustrated, or separate, individual such members mounted together in one manner or another as a functional unit). As will be understood, the oscillating knife ("wirecut head"), while comprising a functionally integrated part of an operating system in which it is used, is mounted directly below the die unit or assembly 120, 220, and powered by its own particular drive train. Thus, while the apparatus in accordance herewith greatly facilitates use of such a wirecut component as an integrated part of the overall operational assembly or unit, particularly with regard to maintenance purposes and activities, the knife/wirecut unit 222 is not actually an integral part of the movable feed-roll head concept under discussion and is not specifically illustrated in FIGS. 3–8 inclusive.

Figure 10:
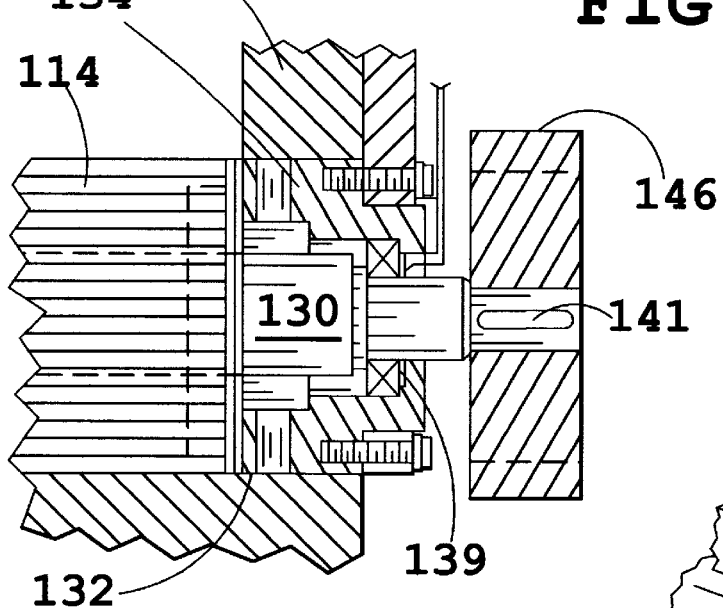
FIG. 10 is an enlarged fragmentary cross sectional view showing the driven end of one of the feed-rolls.
Figure 11:
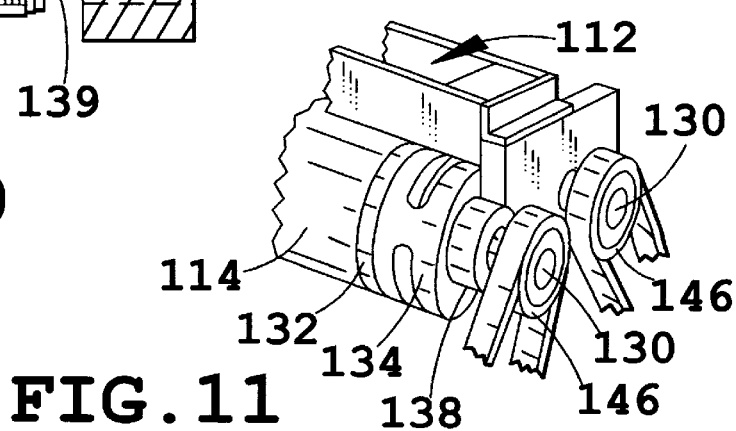
FIG. 11 is a fragmentary perspective view showing the apparatus of FIG. 10 on a slightly reduced scale.
Figure 9:
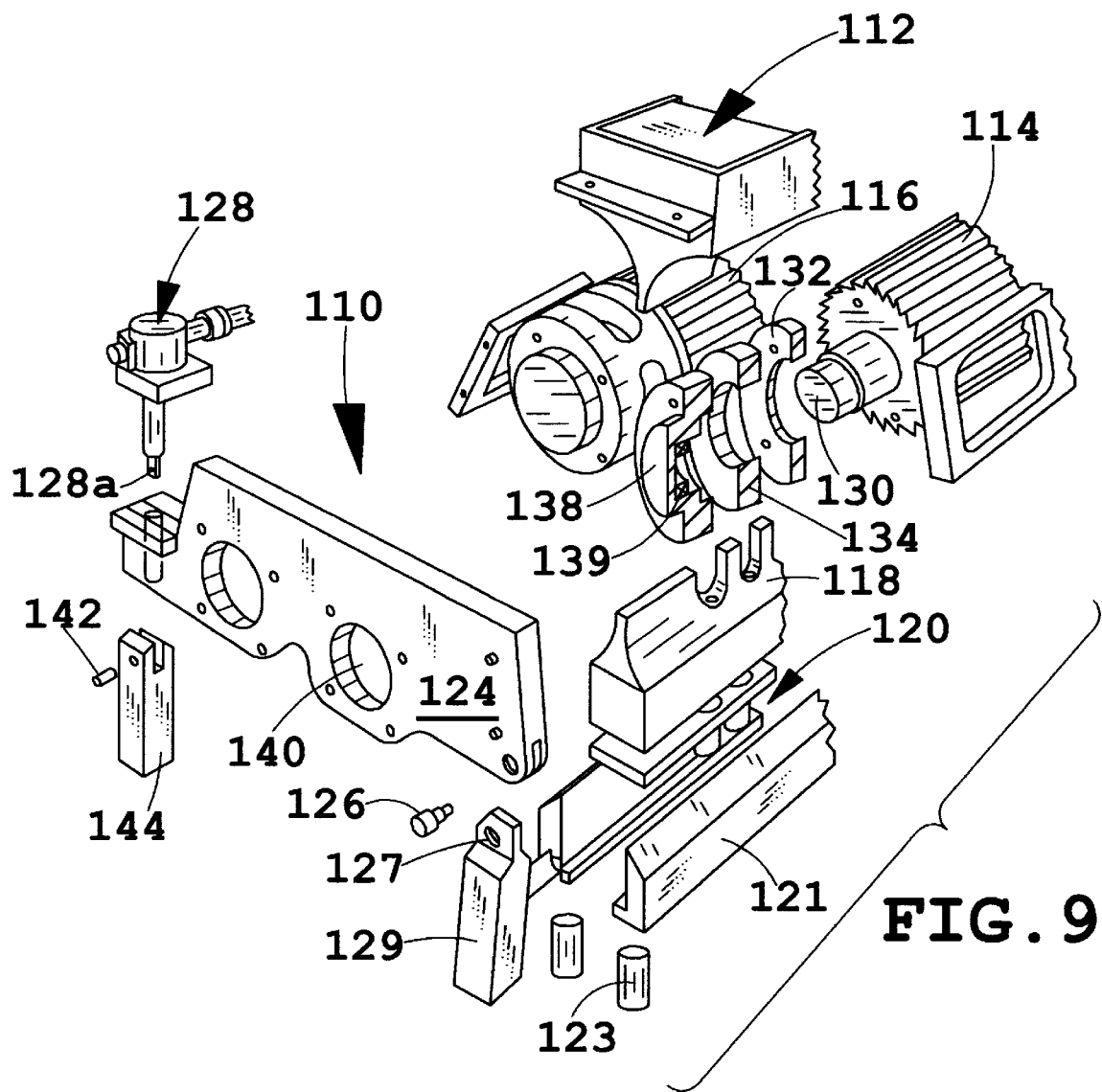
FIG. 9 is an enlarged fragmentary perspective view showing further details of the apparatus depicted in FIGS. 3, 4, and 5.

A further and more detailed illustration of particular parts of a feed-roll assembly/unit 110, of the type shown and described above in connection with FIGS. 1, 3, 4 and 5 is illustrated in FIGS. 9, 10, and 11, of which FIG. 9 comprises a fragmentary, exploded perspective view showing the non-driven end of the assembly, FIG. 10 comprises a fragmentary, enlarged sectional side elevation showing the other (i.e., driven) end of an individual mounted feed-roll, and FIG. 11 comprises a fragmentary perspective view showing the driven end portion of two adjacent feed-rolls. Thus, in FIG. 9, the end support or headframe 124 is shown in axial alignment with, but spaced and separated from the feed-rolls 114, 116 which it mounts, as well as from the filler block 118 and die unit 120, which includes the die support bars 121 and support posts 123 disposed beneath the feed-rolls. In this preferred structural arrangement, each of the feed-rolls 114, 116 has an outwardly protruding trunnion or axle shaft 130 at each end, over which two different ring-like members 132, 134 are telescoped as extensions to the feed-roll itself. The first such ring 132 is a slip ring and spacer made from nickel-silver or other such material (including polymerics such as Delrin), provided for cleanliness and sterility between the adjacent end surfaces of the feed-roll and outer ring 134, both of which are typically made from stainless steel. Ring 134 is a static end ring which serves to mount the associated feed-roll, preferably having a protruding hub-like mounting portion 138, and an internal bearing 139 that receives trunnion 130. The protruding mounting hub 138 is receivable within a corresponding, closely fitting aperture or recess 140 formed in the end support or headframe 124.

The particular position of each such feed-roll must be accurately established relative to the adjacent filler block 118 for proper operation, and thus is preferably accomplished in accordance herewith by the outer diameter of the static end rings 134, which rest directly against the complementary curving upper surface on each side of the filler block. Thus, the outside perimetral surface of the static end rings accurately and positively establish the clearance between the outer working surface of the feed-roll (which is of slightly smaller diameter) and the filler block. As mentioned previously, jack screw 128 is preferably anchored in the main frame of the machine, as by a pin 142 passing through the end 128*a* of the jack screw and a corresponding aperture in an upstanding jack post 144 which is rigidly mounted. Similarly, the pivot pin 126 is anchored within its corresponding aperture 127 in an upstanding headframe pivot post 129. This same arrangement is equally true in the machine shown in FIG. 2, wherein each pair of feed-rolls is nested closely adjacent its respective filler block by contact between the corresponding static end rings and curved filler block surfaces. As indicated above, this relative positioning is positively maintained by locking the two movable feed-roll units together.

The assembly of these elements, described above in connection with FIG. 9, is shown in FIGS. 10 and 11 on the driven side of the machine, where the axial trunnion 130 of feed-roll 114 extends outwardly through spacer/slip ring 132 and static mounting ring 134, and hub 138 is secured (as by a key 141 or the like) to a drive gear or pulley 146. As generally illustrated in FIGS. 1 and 3, on the non-driven side of the apparatus shown in FIG. 9, the outer face of hub 138 preferably is dimensioned to lie flush with the outer face of the headframe 124. Alternatively, it may seat within a corresponding blind-ended recess formed in the adjacent side of the support 124, such that it is not visible from the outside.

The preferred nature of the adjustment mechanism (jacking members) 228 of the embodiment of FIGS. 2, 6, 7, and 8 is shown in more detail in FIGS. 12 and 13, which should be viewed in conjunction with the others figures just noted. As so illustrated, the adjustment mechanism 228 includes a screw jack assembly 232 located on each side of the feed-roll head, coupled together for conjoint operation by an elongated actuation shaft 234 which spans the width of the head. As will be understood, rotation of the elongated shaft 234 rotates a driving gear (not specifically illustrated) within a housing 236, and this in turn drives the screw jack output member 238 to move it upwardly and/or downwardly (as illustrated in FIGS. 12 and 13). Screw jack output member 238 extends downwardly through a generally rectangular, open-centered mounting fixture 240 having a pair of spaced sides 242, 244 and spaced ends 246, 248, and is connected between a pair of upstanding mounting tabs 250 of a pivotal actuation member 252. Mounting fixture 240 is rigidly attached to a structural part of the pivotal feed-roll head associated with pivotal support member 224, preferably an elongated brace or tie rod 254 which extends between the spaced end support members 224, as for example by a connecting bolt or stud (not specifically shown) that passes through an aperture 256 extending through mounting fixture end plate 246 (FIG. 12). Screw jack assembly 232 has a base plate 258 by which it is secured to a pivotal mounting plate 260, and the latter has a pair of integral, downwardly depending and mutually spaced mounting brackets 262, by which it is pivotally connected to a pair of cooperatively disposed, upstanding ear-like projections 264 which comprise an integral part of the mounting fixture 240. In turn, the pivotal actuation linkage 252 is rotatably attached to mounting fixture 240 by a pivot pin 266 which seats in a corresponding aperture 268 of the pivot linkage 252 and is rotatably received through a pair of spaced apertures 270 formed in the sides 242, 244 of mounting fixture 240. A force-transmitting roller 272 of steel or the like, comprising in essence a movably mounted load-bearing member, is secured between the spaced, projecting ends 252A, 252B of pivot member 252.

As best illustrated in FIG. 13 (but also seen in FIGS. 6, 7, and 8), the force-transmitting roller or cam 272 bears downwardly at an angle against a structural part of the feed-roll head which incorporates end support members 225, preferably an elongated brace or tie-rod 274 extending between the two spaced feed-roll support members 225 directly comparable to brace or tie-rod 254 mentioned above to which the mounting fixture 240 and jack 232 are secured. Accordingly, upon actuation of the two interconnected screw jack assemblies 232 (by rotation of the elongated actuation shaft 234), each screw jack output member 238 will force the pivotal actuation linkage 252 angularly downwardly, applying increasing pressure between the roller 272 and brace or tie-rod 274. Due to the relative positions of the screw jacks, this force initially serves to move feed-roll head 224 away from feed-roll head 225 due to the reactive force so created (i.e., head 224 is in effect pushed away from head 225). After an initial increment of such movement, however, the relative angulation between the feed-roll heads and the force vectors created therebetween cause both of the feed-roll heads 224 and 225 to simultaneously pivot about their mounting pins 226 and 227 in a direction away from one another, as illustrated in FIGS. 7 and 8, since the overlapping upper extremities of the heads causes the movement imparted to head 224 to pull head 225 along with it. In this regard, the screw jack assembly 232 is carried along with feed-roll head 224 due to the rigid coupling between mounting fixture 240 and brace or tie bar 254, and roller 272 of pivotal actuation linkage 252 remaining in contact with but moving progressively across the brace or tie bar 274 of feed-roll head 224 as actuation linkage 252 pivots continually outward from between the spaced sides of mounting fixture 240 and roller 272 moves progressively away from mounting fixture 240.

Of course, upon rotation of actuation member 234 in the opposite direction, the two mutually articulated feed-roll heads 224 and 225 move back toward one another, to the fully seated position shown in FIG. 6, in which the upper portions of the two feed-roll support members at each end come into contact with one another and, ultimately, overlap so that the securement member 231 may be engaged and tightened in place for operation of the feed-roll units. In the latter regard, it may be noted that the clamp-like securement member 230 of FIGS. 6–8 inclusive is illustrated as a threaded bolt-like member carrying an adjustment nut and washer, mounted in a slot between a pair of spaced projections of support 224 so as to pivot downwardly between a pair of complementary spaced projections at the top of support 225 having a generally vertical shoulder 231 against which such adjustment nut may be tightened to lock the two supports 224, 225 together. An alternative clamp-like member 230A is illustrated in FIG. 13, comprising in essence a clevis which is pivotally secured to the top of one of the support members so as to drop into place with respect to a squared shoulder on the other such member, whereupon a lock bolt 230B may be tightened in the same manner as just described with respect to FIGS. 6, etc.

The novel mutually articulated double-headed apparatus just described may of course be actuated by other and different types of mechanisms than the screw jack arrangement just described, even though that it is regarded as the preferred embodiment and has a number of advantages. While the particular such mechanism illustrated and described herein does not incorporate the same type of positive-indexing bi-directional position-retaining capability of the embodiment shown in FIGS. 3–5 inclusive, modest changes to the specific arrangement described above could in fact provide such operation, as for example by changing the roller 272 into a sliding pivotal connection between the outboard end of actuation member 252 and the adjacent feed-roll head, e.g., brace or tie bar 274. By so doing, the lockup mechanism 230 may be rendered unnecessary, although that is a simple and convenient means of assuring the desired secure connection between the two feed-roll heads and their adjacent filler block, etc. Similarly, numerous other alterations or variations in the particular preferred embodiments described and illustrated herein may no doubt occur to those skilled in the art upon considering the foregoing disclosure. Accordingly, these preferred embodiments should be considered as illustrative only, and terminology used to describe them should be considered as exemplary, rather than limiting or exclusionary. Terms such as "roll-mounting portion", "trunnions" and/or "axles", used in conjunction with the mounting of the feed-rolls, will be understood to refer to the same or similar subject matter, meaning essentially any rotary support suitable for use in mounting the feed-rolls. Similarly, terms such as "structural support member", "plate-like beam member" and feed-roll "support structure" (or "movably mounted support structure") all refer generally to the support members 124, 224, etc., and similar or equivalent structure. Of course, terminology such as "positioning apparatus", "actuator for imparting controlled movement", "force-multiplier apparatus", etc., refers to the jack mechanism 228 and similar or equivalent structures, which desirably (but perhaps not necessarily) provide mechanical advantage.

In addition, it will be understood that a "feed-roll head" may have a complement of feed-roll units other than a pair, as expressly disclosed herein above, including even a single such feed-roll member (which, if utilized, would typically be mounted in a position closely adjacent some other and related structure within or as part of the hopper, considered in a broad sense, e.g., a hopper wall or internal baffle wall). As for the term "hopper", it will be understood that this is a term of broad meaning as a general matter, and is used herein in a non-limiting sense, even to the inclusion of essentially any media-inlet structure operating in conjunction with the feed-roll units. Indeed, while the movable, adjustable and coordinated extruder heads specifically described above are all shown as being of the feed-roll type, the underlying concept could of course be used in other particular types of apparatus, even including nonfeed-roll types. Further, while terminology such as "distribution apparatus" is used to refer to apparatus such as the filler block and/or die unit referred to above and "pivot linkage" is sometimes used to refer generally to the jack assembly output mechanism 240, 252 etc. (sometimes called a "double-clevis" jack mount), these also represent particular applications and structures which may be implemented by use of specifically different such apparatus, to the extent functionally similar or equivalent. It is to be pointed out once again that while the foregoing disclosure addresses a particular preferred embodiment, and best mode, the particular apparatus described and the various detailed aspects thereof noted are regarded as pertaining to only the most preferred version of the invention and to merely illustrate the principles and concepts involved in the invention, other embodiments and versions of the invention no doubt being feasible and potentially appropriate in other circumstances. It is therefore to be understood that the foregoing description of a particular preferred embodiment is provided for purposes of description and illustration, and not as a measure of the invention, whose scope is to be defined solely by reference to the ensuing claims. Embodiments of the invention differing from those set forth above which nonetheless utilize the underlying concepts of the invention and incorporate its spirit should therefore be considered as within the scope of the claims appended below, unless such claims by their language specifically state otherwise.

The embodiments of the invention in which an exclusive property or privilege is claimed are defined as follows:

1. A position-variable feed-roll head for a food extruder or the like, comprising in combination:
   at least one pair of generally cylindrical feed-rolls disposed in generally parallel relation and close proximity to one another;
   each of said feed-rolls having a longitudinal axis of rotation and a pair of mutually spaced ends, each such end having a roll-mounting portion located coaxially along said axis;
   a structural support member for each end of said pair of feed-rolls, each such support member having a pair of mutually spaced mounting structures for rotatably receiving the roll-mounting portions of each of said feed-rolls which are located at a common end whereby said feed-rolls in said pair are mounted as a unit in fixed relative position between shared structural support members for rotation about their respective axes;
   each of said structural support members having a movable mount at a first location disposed in alignment with the other such movable mount, whereby both of said feed-rolls in said pair thereof and their structural support members may all be moved together as a unit upon said mutually aligned mounts to change the position of said feed-rolls with respect to adjacent extruder apparatus without changing the position of said rolls relative to one another; and
   positioning apparatus operatively engageable with said structural support members to move them and their associated feed-fols as a unit upon said movable mounts as just recited.

2. A position-variable feed-roll head as recited in claim 1, wherein said feed-rolls in said pair have trunnion axles at each end by which they are rotatably supported by said structural support members.

3. A position-variable feed-roll head as recited in claim 1, wherein said structural support members each comprise a unitary plate-like beam member.

4. A position-variable feed-roll head as recited in claim 1, wherein said movable mount for said structural support members comprises a pivotable structure.

5. A position-variable feed-roll head as recited in claim 4, wherein said pivotable structure comprises a pivot pin.

6. A position-variable feed-roll head as recited in claim 4, wherein said pivotable structure comprises an eccentric pivot structure.

7. A position-variable feed-roll head as recited in claim 1, wherein said positioning apparatus comprises a jack mechanism.

8. A position-variable feed-roll head as recited in claim 7, wherein said jack mechanism comprises a screw jack.

9. A position-variable feed-roll head as recited in claim 1, further including a hopper for supplying media to said feed-rolls, said hopper mounted on said structural support members in predetermined relation to said feed-rolls as a part of said unit.

10. A position-variable feed-roll head as recited in claim 1, including a filler block and die assembly disposed beneath said movably mounted feed-roll unit, and wherein said feed-roll unit is mounted for movement toward and away from said filler block to selectively expose and facilitate removal thereof for cleaning or the like.

11. A position-variable feed-roll head as recited in claim 10, wherein said feed-rolls have associated portions which are shaped and adapted to contact portions of said filler block to establish a predetermined spacing of other feed-roll portions with respect to said filler block.

12. A position-variable feed-roll head as recited in claim 11, wherein said associated portions of said feed-rolls which are shaped and adapted to contact portions of said filler block comprise generally cylindrical static rings at the ends of said feed-rolls.

13. A position-variable feed-roll head as recited in claim 12, wherein said static end rings are also disposed in contact with said structural support members for said feed-rolls.

14. A position-variable feed-roll head as recited in claim 13, wherein said feed-rolls in said pair have trunnion axles at each end by which they are rotatably supported by said structural support members, said trunnion axles being associated with said static end rings.

15. A position-variable feed-roll head for a food extruder or the like, comprising in combination:
   first and second feed-roll-actuated media supply units for transferring a desired flowable media from a hopper to a distribution apparatus;
   each of said media supply units including at least one feed-roll mounted for rotation within at least a portion of said hopper and in predetermined position such that rotation of the feed-roll forces media out of the hopper to said distribution apparatus;
   movably mounted support structure for at least one of said first and second media supply units, whereby said at least one media supply unit and its said at least one feed-roll may be shifted in position as an integral unit with respect to said distribution apparatus; and
   an actuator for imparting controlled movement to said movably mounted support structure and said at least one of said media supply units.

16. A position-variable feed-roll head as recited in claim 15, wherein at least one of said first and second media supply units includes a pair of feed-rolls rotatably mounted in close proximity to one another for movement together as a unit in relation to said distribution apparatus.

17. A position-variable feed-roll head as recited in claim 16, wherein each of said first and second media supply units includes a pair of feed-rolls rotatably mounted in close proximity to one another for movement together as a unit in relation to said distribution apparatus.

18. A position-variable feed-roll head as recited in claim 15, including a movably mounted support structure for each of said first and second media supply units, whereby each of said units is mounted for movement toward and away from said distribution apparatus.

19. A position-variable feed-roll head as recited in claim 18, wherein said first and second media supply units are mounted for movement toward and away from each other.

20. A position-variable feed-roll head as recited in claim 19, wherein each of first and second media supply units is inclined at an angle with respect to and extends generally toward the other such unit.

21. A position-variable feed-roll head as recited in claim 19, wherein each of said first and second media supply units includes its own separate media hopper, and each such hopper is mounted for movement along with its respective media supply unit.

22. A position-variable feed-roll head as recited in claim 21, wherein each of said first and second media supply units includes a pair of feed-rolls rotatably mounted in close proximity to one another for movement together as a unit in relation to said distribution apparatus.

23. A position-variable feed-roll head as recited in claim 15, wherein said actuator for imparting controlled movement comprises a force-multiplier apparatus having an operating member which bears against a structural portion of at least one of said media supply units.

24. A position-variable feed-roll head as recited in claim 23, wherein said force-multiplier apparatus comprises a screw-type jack having an output element, and wherein said operating member is rigidly coupled to the output element of said jack.

25. A position-variable feed-roll head as recited in claim 23, wherein said actuator includes a pivot linkage.

26. A position-variable feed-roll head as recited in claim 25, wherein said linkage includes a base portion which is attached to one of said media supply units and further includes a pivotal link having a load-bearing element which is movably coupled to the other of said media supply units.

27. A position-variable feed-roll head as recited in claim 23, wherein said force-multiplier apparatus is mounted on one of said media supply units and its said operating member bears against a structural portion of the other such media supply unit to move at least one such unit relative to the other.

28. A position-variable feed-roll head as recited in claim 27, wherein said first and second media supply units are each mounted for movement and said force-multiplier apparatus moves each of said media supply units.

29. A position-variable feed-roll head as recited in claim 28, wherein said first and second media supply units are mounted for at least partially pivotal movement toward and away from one another, and wherein said force-multiplier apparatus moves each of said media supply units pivotally toward or away from one another.

30. A position-variable feed-roll head as recited in claim 29, wherein said actuator for imparting controlled movement of said media supply units includes a pivot linkage having a base portion which is mounted on one of said media supply units and further includes a pivot linkage carried by said base portion, said pivot linkage having a load-bearing element which is movably coupled to the other of said media supply units.

31. A position-variable feed-roll head as recited in claim 30, wherein said load-bearing element comprises a roller member which rollably bears against said other of said media supply units.

32. A method of supporting and positioning a feed-roll-type media supply component for use in an extruder, comprising the steps:

rotatably mounting the feed-roll-type component between end support members in a position closely adjacent to a cooperating structure to define a desired operating gap therebetween through which the feed-roll component will force extrusion media when rotated;

movably mounting the end support members upon a fixed and stable base structure associated with the extruder above an extrusion media distribution apparatus;

and moving the end support members and the feed-roll component mounted thereon as a unit relative to said media distribution apparatus to establish a predetermined proximity between said feed-roll component and said media distribution apparatus without changing the relative positioning established between the feed-roll component and end support members in rotatably mounting the feed-roll component between the end support members.

33. The method as recited in claim 32, including the step of using a jack assembly to move said end support members and feed-roll component as a unit relative to said media distribution apparatus.

* * * * *

UNITED STATES PATENT AND TRADEMARK OFFICE
CERTIFICATE OF CORRECTION

PATENT NO. : 6,139,178
DATED : October 31, 2000
INVENTOR(S) : Simon A. Whysall

It is certified that error appears in the above-identified patent and that said Letters Patent is hereby corrected as shown below:

<u>Column 9, claim 1,</u>
Line 54, "feed-fols" should be -- feed-rolls --.

Signed and Sealed this

Thirtieth Day of October, 2001

Attest:

NICHOLAS P. GODICI
*Attesting Officer*     *Acting Director of the United States Patent and Trademark Office*